(12) United States Patent
Uhlhorn et al.

(10) Patent No.: US 10,007,275 B2
(45) Date of Patent: Jun. 26, 2018

(54) DILUTION ADJUSTMENT SYSTEM AND METHOD

(71) Applicant: Diversey, Inc., Sturtevant, WI (US)

(72) Inventors: Robert-Jan Uhlhorn, Tricht (NL); Andrew J. Cocking, Ben Lomond, CA (US); David Holden, Derbyshire (GB); Martin Cooper, Leicester (GB); Michael Brudenell, Notts (GB); Barry Hague, South Yorkshire (GB)

(73) Assignee: Diversey, Inc., Sturtevant, WI (US)

( * ) Notice: Subject to any disclaimer, the term of this patent is extended or adjusted under 35 U.S.C. 154(b) by 226 days.

(21) Appl. No.: 14/584,541

(22) Filed: Dec. 29, 2014

(65) Prior Publication Data

US 2016/0185589 A1  Jun. 30, 2016

(51) Int. Cl.
  *G05D 11/00* (2006.01)
  *G05D 11/13* (2006.01)
(52) U.S. Cl.
  CPC ....... *G05D 11/132* (2013.01); *Y10T 137/0329* (2015.04); *Y10T 137/2499* (2015.04)
(58) Field of Classification Search
  CPC .............. B01F 15/0441; B01F 15/0454; B01F 15/0458; G05D 11/132
  USPC ...................................................... 137/3, 88
  See application file for complete search history.

(56) References Cited

U.S. PATENT DOCUMENTS

| | | | | |
|---|---|---|---|---|
| 2,243,826 A | * | 5/1941 | Nielsen | C02F 1/5281 137/3 |
| 2,513,562 A | * | 7/1950 | Holuba | B01F 15/0408 137/263 |
| 2,675,946 A | * | 4/1954 | Strempel | G05D 11/132 222/137 |
| 3,421,694 A | * | 1/1969 | Muller | B01J 4/008 239/124 |
| 3,481,350 A | * | 12/1969 | Chamberlain | G05D 11/006 137/101.11 |
| 4,076,465 A | | 2/1978 | Pauliukonis | |
| 4,194,650 A | * | 3/1980 | Nottke | B01F 15/0416 222/133 |

(Continued)

OTHER PUBLICATIONS

International Search Report for Application No. PCT/US15/67625 dated Mar. 18, 2016 (10 pages).

(Continued)

*Primary Examiner* — Umashankar Venkatesan
(74) *Attorney, Agent, or Firm* — Michael Best & Friedrich LLP (57) ABSTRACT

A dispenser system including a source of chemical concentrate, a source of diluent, and a mix chamber in fluid communication with the source of chemical concentrate via a first line and with the source of diluent via a second line to mix chemical concentrate and diluent to form a dilution. The dispenser system also includes one or more metering devices disposed in one or both of the first line and the second line, a discharge fluidly coupled to the mix chamber to deliver the dilution to a downstream receptacle, and a control system in communication with the one or more metering devices. The control system is programmed to adjust a concentration of chemical concentrate in the dilution via control of the one or more metering devices based on an environmental factor affecting a physical environment to be cleaned using the dilution.

7 Claims, 5 Drawing Sheets

(56) References Cited

U.S. PATENT DOCUMENTS

| | | | |
|---|---|---|---|
| 4,357,953 A | 11/1982 | Patterson | |
| 4,955,507 A * | 9/1990 | Kirschner | B67D 1/0037 |
| | | | 137/100 |
| 5,109,347 A | 4/1992 | Quick, Jr. et al. | |
| 5,218,988 A * | 6/1993 | McNamara | G05D 11/132 |
| | | | 137/101.21 |
| 5,327,613 A * | 7/1994 | Ohtsu | B60S 1/3411 |
| | | | 15/250.01 |
| 5,351,892 A | 10/1994 | Conte | |
| 5,494,644 A | 2/1996 | Thomas et al. | |
| 5,746,238 A | 5/1998 | Brady et al. | |
| 5,799,831 A | 9/1998 | Spriggs et al. | |
| 6,098,646 A | 8/2000 | Hennemann et al. | |
| 6,120,175 A | 9/2000 | Tewell | |
| 6,143,257 A | 11/2000 | Spriggs et al. | |
| 6,238,081 B1 | 5/2001 | Sand | |
| 6,314,996 B1 * | 11/2001 | Borglum | A01B 69/022 |
| | | | 137/565.29 |
| 6,377,868 B1 | 4/2002 | Gardner, Jr. | |
| 6,499,872 B2 | 12/2002 | Sand | |
| 6,619,318 B2 | 9/2003 | Dalhart et al. | |
| 6,655,401 B2 | 12/2003 | Sand et al. | |
| 6,685,054 B2 | 2/2004 | Kameyama | |
| 6,697,706 B2 | 2/2004 | Gardner, Jr. | |
| 6,708,901 B2 | 3/2004 | Hubmann et al. | |
| 6,732,953 B2 * | 5/2004 | Krause | B01F 15/00175 |
| | | | 15/250.01 |
| 6,895,307 B2 | 5/2005 | Gardner, Jr. | |
| 6,979,569 B1 | 12/2005 | Carver, Jr. et al. | |
| 6,988,675 B2 | 6/2006 | Hubmann et al. | |
| 7,058,519 B2 | 6/2006 | Arno | |
| 7,063,097 B2 | 6/2006 | Arno et al. | |
| 7,325,560 B2 | 2/2008 | Arno et al. | |
| 7,516,763 B2 | 4/2009 | Bertucci et al. | |
| 7,963,304 B2 | 6/2011 | Bertucci et al. | |
| 8,261,780 B2 | 9/2012 | Thomas et al. | |
| 2003/0234031 A1 * | 12/2003 | Krause | B60S 1/488 |
| | | | 134/18 |
| 2009/0065065 A1 | 3/2009 | Sand | |
| 2014/0261824 A1 | 9/2014 | Byers et al. | |
| 2015/0250214 A1 * | 9/2015 | Massey | A23F 3/163 |
| | | | 222/1 |

OTHER PUBLICATIONS

Written Opinion for Application No. PCT/US15/67625 dated Mar. 18, 2016 (7 pages).

* cited by examiner

– –
DILUTION ADJUSTMENT SYSTEM AND METHOD

FIELD OF THE INVENTION

The present invention relates to a system to dispense a chemical concentrate, and more specifically, to a system that adjusts the amount of a chemical concentrate in a dilution to be dispensed.

BACKGROUND

Systems for diluting and dispensing a concentrated chemical are generally known in the art. These systems typically have a source of concentrated chemical that is provided to a mixing location, where the concentrated chemical mixes with a diluent to form a diluted chemical or dilution. The dilution may then be stored or dispensed through an outlet in the system for an end use.

For ease of system operation and consistency of dilution concentration, existing systems provide a concentrated chemical to a mixing location at a uniform rate. Diluent is also provided to the mixing location at a uniform rate proportioned to the rate of concentrated chemical. These systems provide for an ease of use, as once the rates of concentrated chemical and diluent to the mixing location are determined (i.e. the dilution ratio), the system dilutes the concentrated chemical to a desired dilution concentration with minimal further adjustment.

However, these systems are limited to a single dilution (i.e. the amount of chemical concentrate in the diluent remains unchanged). Adjusting existing systems to include different dilutions of chemical concentrate would necessitate adjustment to the dilution ratio or diluent rate, or both, which can be time consuming for a user and generate undesirable variability in the concentration of chemical in the mixture caused by inaccuracies during adjustment to the dilution ratio or diluent rate. In addition, these systems do not provide for easy adjustment the chemical concentration. A user is often limited to manual adjustment of diluent flow rate, which is also time consuming and may generate variability in the concentration of chemical mixed in diluent.

SUMMARY OF THE INVENTION

The invention provides, in one aspect, a dispenser system including a source of chemical concentrate, a source of diluent, and a mix chamber in fluid communication with the source of chemical concentrate via a first line and with the source of diluent via a second line to mix chemical concentrate and diluent to form a dilution. The dispenser system also includes one or more metering devices disposed in one or both of the first line and the second line, a discharge fluidly coupled to the mix chamber to deliver the dilution to a downstream receptacle, and a control system in communication with the one or more metering devices. The control system is programmed to adjust a concentration of chemical concentrate in the dilution via control of the one or more metering devices based on an environmental factor affecting a physical environment to be cleaned using the dilution.

The invention provides, in another aspect, a method of adjusting a chemical concentration of a dilution dispensable from a dispenser system. The method includes mixing chemical concentrate from a chemical concentrate source and a diluent from a diluent source within a mix chamber to form the dilution, and increasing or decreasing an amount of one or both of the chemical concentrate and the diluent provided to the mix chamber to adjust a concentration of chemical concentrate in the dilution in response to a change in an environmental factor affecting a physical environment to be cleaned using the dilution.

The invention provides, in another aspect, a dispenser system including a source of chemical concentrate, a mix chamber, and a source of diluent in fluid communication with the mix chamber. The dispenser system also includes a first flow path that is in fluid communication with the source of chemical concentrate and the mix chamber, and a second flow path that is in fluid communication with the source of chemical concentrate and the mix chamber. The second flow path has a metering device to control the amount of chemical concentrate directed from the source of chemical concentrate to the mix chamber through the second flow path. A discharge is in fluid communication with the mix chamber to deliver the dilution to a downstream receptacle. Chemical concentrate and diluent mix within the mix chamber to form a dilution, and the metering device is adjustable to increase or decrease flow of chemical concentrate through the second flow path to modify the concentration of chemical concentrate in the dilution exiting the mix chamber through the discharge.

Other features and aspects of the invention will become apparent by consideration of the following detailed description and accompanying drawings.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

The invention illustrated in the Figures and disclosed herein is generally directed to one or more examples of a system 100, 200, 300, 400, 500 that adjusts the amount of chemical to be mixed with a diluent. That is, the system, 100, 200, 300, 400, 500 selectively increases or decreases the chemical concentration in a dilution to be dispensed from the system.

For ease of discussion and understanding, and for purposes of description only, the following detailed description will refer to 'environmental factors.' It should be appreciated that the term environmental factors may include, but is not limited to, changes in the environment caused by seasonal changes, general changes in the physical environment surrounding system 100, 200, 300, 400, 500, the environment in which the dilution may be used, changes in weather (humidity, temperature, etc.), a weather event, a forecast of weather, amount of pedestrian traffic, or any other information that would lead to a change in concentration of the dilution.

Figure 1:
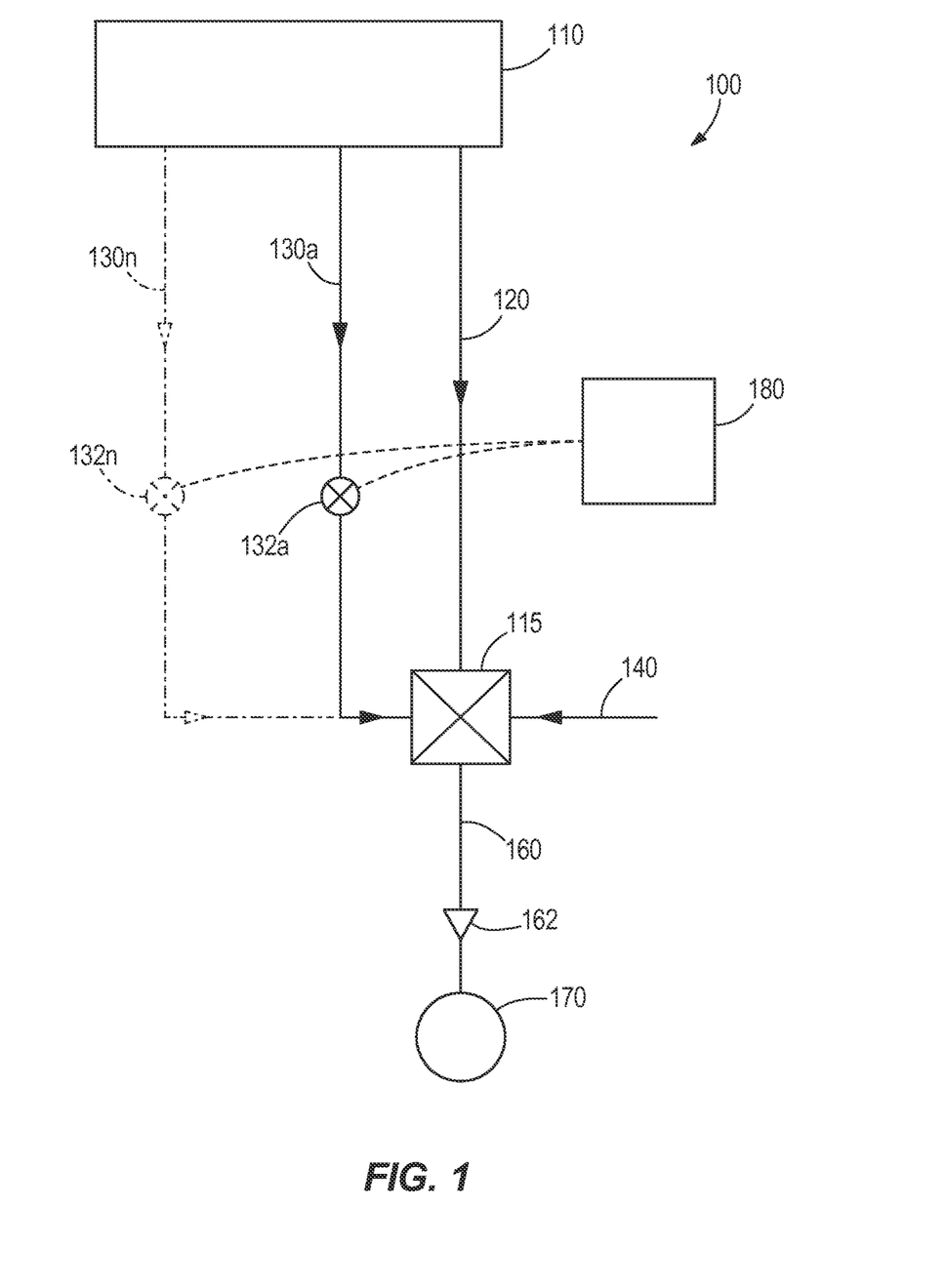
FIG. 1 is a flow diagram illustrating an exemplary system embodying the invention that selectively adjusts the concentration of chemical concentrate to be mixed with a diluent.

Referring now to the Figures, FIG. 1 illustrates an exemplary system 100 that selectively adjusts the concentration of chemical concentrate to be mixed with a diluent. The system 100 provides a dilution of a chemical concentrate and a diluent. For example, the chemical concentrate can be a concentrated cleaning chemical that mixes with water as the diluent. The diluted cleaning chemical is suitable for cleaning surfaces such as a floor. The system 100 may be used in any desired environment, including commercial, retail, residential, or industrial.

The system 100 includes a chemical concentrate source 110 (e.g., a chemical pack or any suitable container, receptacle, or vessel for retaining a concentrated chemical or chemical product), a chemical-diluent mix chamber 115, and a primary supply line 120 and a secondary supply line 130 coupled between the source 110 and the mix chamber 115. The concentrated chemical retained in the chemical concentrate source 110 may be a homogeneous or heterogeneous material, and may include one or more chemicals or compounds provided as a mixture. Generally, the concentrated chemical has a concentration that is greater than the concentration in the dilution that exits system 100. As will be appreciated, the chemical concentrate can take a liquid form, a solid form (e.g., powdered or block), or in any other suitable form or state for use in the system 100.

As illustrated, the primary supply line 120 is fluidly coupled to the source 110 and the mix chamber 115 to provide a continuous flow of concentrated chemical to the mix chamber 115, although a valve or other control mechanism can be disposed in the supply line 120 (e.g., to shutdown flow of chemical concentrate in the system 100) to control flow of chemical concentrate to the mix chamber 115. The secondary chemical supply line 130 also is fluidly connected to the chemical concentrate source 110 and the mix chamber 115. The secondary supply line 130 includes a flow regulator or valve 132 (e.g., a solenoid valve 132). The valve 132 regulates the flow of concentrated chemical from the chemical concentrate source 110 to the mix chamber 115. The valve 132 has an open position or 'on' state or first position to allow concentrated chemical flow, and a closed position or 'off' state or second position to block or inhibit concentrated chemical flow. The open position of the valve 132 may include any suitable valve position between the closed position up to, and including, the completely open position to provide different flow rates of concentrated chemical to the mix chamber 115. The primary and secondary supply lines 120, 130 may be any suitable conduit for transporting the concentrated chemical from the chemical concentrate source 110 to the mix chamber 115.

The system 100 also includes a diluent supply line 140 that is fluidly coupled to the mix chamber 115. The diluent supply line 140 is connected to a diluent source, which may include any suitable source of the diluent, such as a pipe, line, or vessel. One exemplary diluent includes water, although the diluent may be any suitable or desired fluid, chemical, compound, or mixture. When flow is active, the diluent supply line 140 provides a continuous flow of diluent to the mix chamber 115, and a valve can be provided to control diluent flow.

The mix chamber 115 provides a location for concentrated chemical to mix with diluent to form a dilution. For example, the mix chamber 115 includes an eductor that mixes chemical concentrate from the source 110 with the diluent from the supply line 140 to form a dilution having a desired mixture of chemical concentrate and diluent. As will be appreciated by one of ordinary skill in the art, the eductor 115 has a venturi tube (not shown) that draws chemical concentrate from one or both of the supply lines 120, 130 and diluent from the diluent supply line 140 to thoroughly mix within the eductor while minimizing risk of backflow into the supply lines 120, 130, 140. In other examples, the mix chamber 115 may be any location or assembly suitable for mixing concentrated chemical with a diluent consistent with the description of the invention herein.

With continued reference to FIG. 1, the system 100 also includes a discharge line 160 that fluidly connects the mix chamber 115 with an outlet 170. The discharge line 160 may be any suitable conduit for transporting the dilution from the mix chamber 115 to the outlet 170. Also, as illustrated in FIG. 1, the discharge line 160 includes a metering device 162 (e.g., a flow meter, flow sensor, check valve, solenoid valve, etc.) to meter or measure the flow of the dilution to the outlet 170. The discharge outlet 170 can have a nozzle, tap, or any other mechanism that is suitable to discharge dilution into a receptacle (e.g., a tank, a storage container, a cleaning machine such as an autoscrubber, or another type of vessel, etc.).

As illustrated, the system 100 includes a secondary chemical supply line 130 and associated components (valves, eductors, metering devices, etc.) to provide two dilutions that have different chemical concentrations. As will be appreciated, the system 100 may include "n" quantity of additional secondary chemical supply lines 130*n* and corresponding valves 132*n* to control flow of chemical concentrate in the respective lines 130*n*.

As illustrated in FIG. 1, the system 100 also includes a controller or system control apparatus 180 that is in operative communication (e.g., wired, wireless communication) with the valve 132 of the secondary supply line 130. The controller 180 may include an input assembly, for example a switch, selector, or other suitable input device to select a predetermined concentration of dilution. Based on the input and the current valve position, the controller 180 sends a signal to the valve 132 to open (or remain open) to increase the concentration of the dilution, or to close (or remain closed) to reduce the concentration of the dilution. In other examples, the controller 180 may be in communication with one or more of the eductor 115, diluent supply line 140, an associated diluent supply valve, or any other device for controlling flow of concentrated chemical and/or diluent. In addition, the controller 180 can have one or more sensors to detect environmental factors, and subsequently use information from the sensors to adjust the concentration of the dilution discharged from the system 100.

In operation of the system 100, concentrated chemical is delivered through the primary supply line 120 to the eductor 115. At the eductor 115, the concentrated chemical mixes with diluent supplied by the supply line 140 to form a dilution containing a predetermined concentration of chemical. The dilution exits the eductor 115 through the line 160, where the flow of diluted chemical may be measured by metering device 162 before discharge through outlet 170.

The system 100 can increase the chemical concentration in the discharged dilution by a desired or predetermined amount by actuating the valve 132 to the open position, which provides an additional flow of concentrated chemical from the source 110 to the eductor 115 through the secondary supply line 130. The additional flow of concentrated chemical increases the concentration of the dilution that exits the eductor 115 through the discharge line 160 by mixing with the same amount of diluent. The system 100 can increase the chemical concentration based on instructions provided by a user or autonomously based on preset instructions in the controller 180. For example, the change in chemical concentration in the system 100 can be in response to environmental factors (e.g., a user response to a change in environmental factors, or based on environmental factors detected from one or more sensors associated with the system 100).

When the system 100 operates with both lines 120, 130 providing a flow of chemical concentrate to the eductor 115 (i.e. with the valve 132 at least partially open), the concentration of the dilution exiting the eductor 115 can be decreased by a desired or predetermined amount by actuating the valve 132 to the closed position. By closing the valve 132, chemical concentrate ceases to flow to the eductor 115 through the secondary supply line 130. The system 100 can decrease the chemical concentration of the dilution based on instructions provided by a user, autonomously based on preset instructions in the controller, or in response to the environmental factors.

It should be appreciated that the minimum or lowest chemical concentration of the dilution is predetermined by the dilution ratio of concentrated chemical provided by the primary supply line 120 and diluent provided by the diluent supply line 140 to the eductor 115. The concentration may be increased by providing additional concentrated chemical via one or more secondary supply lines 130a-n without increasing the amount of diluent being mixed with the concentrated chemical. Additional secondary supply lines 130n may be provided from the chemical concentrate source 110 to the mix chamber 115 to provide further adjustability to the chemical concentration of the dilution.

Figure 2:
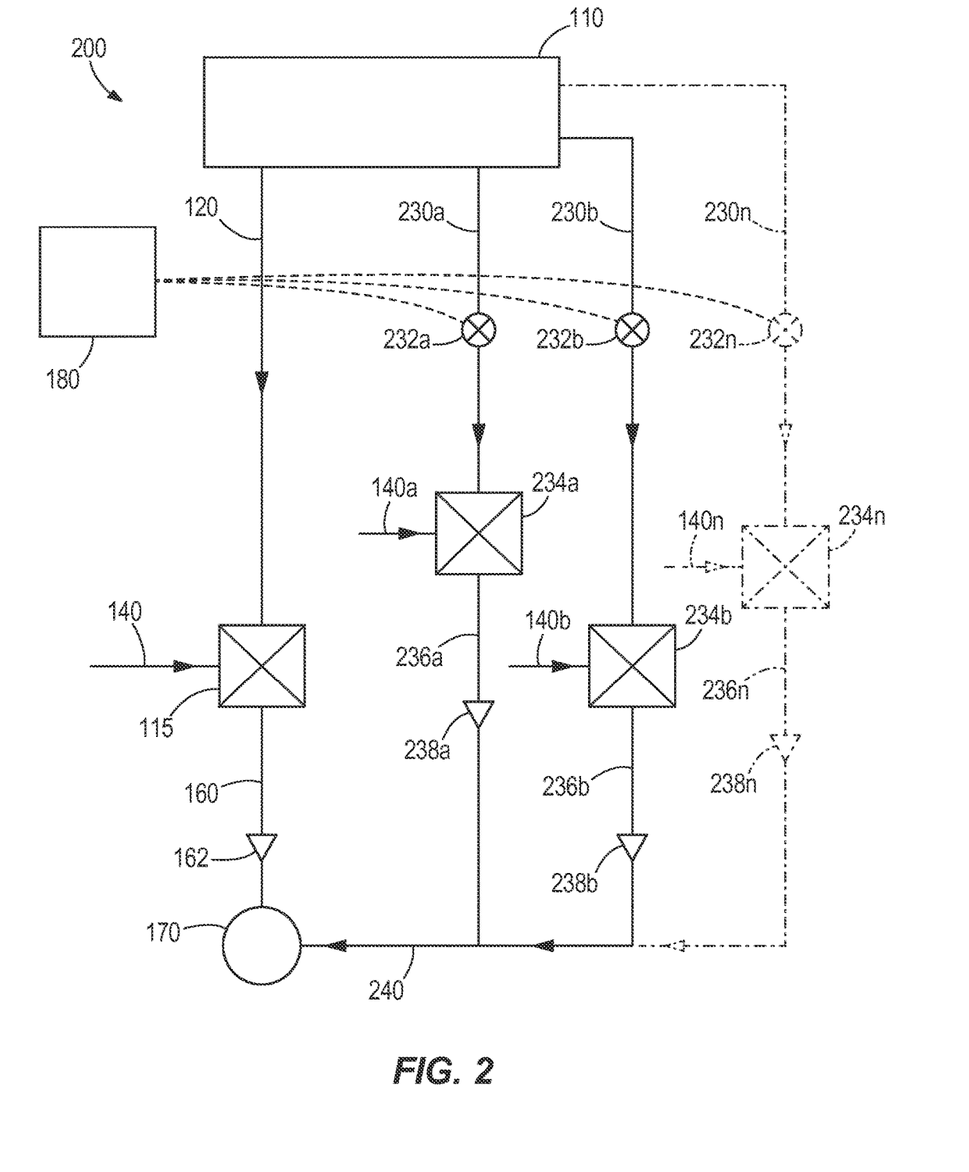
FIG. 2 is a flow diagram illustrating another exemplary system embodying the invention that selectively adjusts the concentration of chemical concentrate to be mixed with a diluent.

FIG. 2 illustrates an exemplary system 200 that selectively adjusts the amount of dilution that can be delivered to the system outlet 170 and that can also adjust the amount of chemical concentrate in the dilution. Except as described below, the system 200 is the same as the system 100 and common elements are given the same reference numerals.

Referring to FIG. 2, the system 200 includes the chemical concentrate source 110, the chemical-diluent mix chamber 115, the primary chemical supply line 120, the diluent supply line 140, the discharge line 160, and a plurality of secondary chemical supply lines 230a, 230b that are fluidly coupled between the source 110 and the system outlet 170. The supply lines 230a, 230b fluidly connect the chemical source 110 with a respective mix chamber 234a, 234b. Preferably, the mix chambers 234a, 234b are eductors that are the same as the eductor 115. Respective diluent supply lines 140a, 140b are connected to the eductors 234a, 234b.

In one example, the eductors 234a, 234b are the same such that the amount of chemical concentrate and the amount of diluent mixed in each eductor 234a, 234b are the same. In another example, one or both of the eductors 234a, 234b can be different from the eductor 115 and each other such that the amount of chemical concentrate and the amount of diluent mixed in each eductor 234a, 234b is different. That is, the mixture ratio of diluent and chemical concentrate differs between at least two of the eductors 115, 234a, 234b. In this example, the dilution exiting at least one of the eductors 115, 234a, 234b has a different chemical concentration such that the chemical concentration of the dilution exiting through the outlet 170 can be adjusted (increased or decreased) a desired or predetermined amount in addition to providing a higher amount of dilution to the outlet 170.

Each supply line 230a, 230b also includes a valve 232a, 232b that is the same as valve 132. The valves 232a, 232b are disposed downstream of the chemical source 110 and upstream of the eductors 234a, 234b to control flow of chemical concentrate to the eductors 234a, 234b. Respective discharge lines 236a, 236b fluidly connect the corresponding eductor 234a, 234b to the outlet 170. Each discharge line 236a, 236b has a metering device 238a, 238b that is disposed downstream of the eductor 234a, 234b and upstream of the outlet 170. As illustrated, the metering devices 238a, 238b are the same as the metering device 162, although the metering devices 238a, 238b can be different.

As illustrated, the system 200 includes two secondary chemical supply lines 230a, 230b and associated components (valves, eductors, metering devices, etc.) to provide dilutions that have different chemical concentrations. Like the system 100, the system 200 may include "n" quantity of additional secondary chemical supply lines 230 and corresponding diluent supply lines 140, valves 232, eductors 234, discharge lines 236, and metering devices 238. Each additional supply line 230n and the components associated with the supply line 230n are the same as supply lines 230a, 230b.

FIG. 2 shows that the discharge lines 236a-n connect or direct the dilution to a combined or merged discharge line 240 that directs the dilutions received from the eductors 234a, 234b to the outlet 170 separate from the dilution delivered to the outlet 170 by the discharge line 160. In another example, the discharge lines 236a, 236b may combine into a single discharge line that fluidly combines with the dilution in the discharge line 160. In yet another example, the discharge lines 236a, 236b may separately fluidly combine into the discharge line 160 or the outlet 170. In a further example, one or more of the additional supply lines 230a-n can be selectively fluidly connected to the eductor 115 and to the eductor 234a-n in parallel. In this example, a bypass line fluidly connects the supply line 230a-n to the eductor 115, and another valve (not shown) cooperates with the valve 232a-n to control the flow of chemical concentrate to the eductors 115, 232a-n.

As will be appreciated, the additional eductors 234a-n are optional and not necessary for the system 200 to operate. More specifically, the secondary supply lines 230a-n can directly fluidly communicate chemical concentrate to the eductor 115 rather than fluidly couple to a separate eductor 234a-n. Likewise, the secondary supply lines 230a-n may fluidly connect and combine into a single eductor 234 in parallel with the eductor 115, rather than to separate secondary eductors 234a, 234b. In such variations of the system 200, some of the components (e.g., additional eductors, separate metering devices, etc.) discussed with regard to the system 200 may not be used.

The system 200 also includes the controller 180 that is in communication with the valves 232a-n to control flow of chemical concentrate through the supply lines 230a-n.

Depending on the input into the controller 180 (autonomously or user-initiated) and the state of the system 200 (i.e. which valves 232a-n are closed), the controller 180 sends a signal to open or close one or both valves 232a, 232b. The controller 180 also may be in communication with one or more of the eductors 115, 234a-n, valves in the diluent supply line 140, 140a-n, or any other device that provides control within the system 200. The controller 180 also can be in communication with one or more sensors to detect environmental factors that may form the basis of control of the system 200, or environmental factors can be transmitted to the controller 180 in other ways to facilitate control and adjustment of the chemical concentration in the dilution at the outlet 170.

In operation of system 200, concentrated chemical is delivered to the eductor 115 through the primary supply line 120. At the eductor 115, the concentrated chemical mixes with diluent supplied by the supply line 140 to form a dilution that has a first predetermined chemical concentration (determined by the amount of chemical concentrate delivered by the supply line 120) to the outlet 170. The dilution exits the eductor 115 through the line 160 and is discharged through the outlet 170.

Depending on the specifics of the system 200 consistent with the foregoing description, the system 200 can 1) selectively increase the amount of the dilution exiting through the outlet 170 without increasing or decreasing the chemical concentration of the dilution, 2) selectively increase the chemical concentration of the dilution to a desired or predetermined amount without increasing the amount of dilution discharged through the outlet 170 (e.g., using a bypass line in one or more of the secondary lines 230a-n), or 3) selectively increase both the amount of dilution and the chemical concentration of the dilution by actuating one or more of the valves 232a-n to the open position. Opening one or more of the valves 232a-n provides one or more additional flows of concentrated chemical from the source 110 to the outlet 170 through the respective supply lines 230a-n. Depending on the mixture ratio of diluent and chemical concentrate in the eductors 234a-n, The additional dilution from the discharge lines 236a-n mixes with the dilution from the discharge line 160. Depending on the mixture ratios of each dilution that is provided to the outlet 170, the amount of dilution or the amount of dilution and the chemical concentration of the dilution can increase at the outlet 170. The system 200 can increase one or both of the amount of dilution and chemical concentration based on instructions provided by a user or autonomously based on preset instructions provided by the controller 180. For example, the change in chemical concentration in the system 200 can be in response to environmental factors (e.g., a user response to a change in environmental factors, or based on environmental factors detected from one or more sensors associated with the system 200).

When the system 200 is operating with one or more of the lines 230a-n providing a flow of chemical concentrate to the outlet 170 (i.e. one or more of the valves 232a-n is at least partially open), the amount of chemical concentrate in the dilution, the amount of dilution, or both, can be decreased by a desired or predetermined amount by actuating one or more of the valves 232a-n to the closed position. By closing the valves 232a-n, the flow of chemical concentrate and diluent is reduced (or ceases) through the respective supply lines 230a-n that have been closed. The system 200 may increase or decrease the chemical concentration of the dilution and/or the amount of dilution for the same reasons described with regard to the system 100 (e.g., based on user instructions, autonomously based on preset instructions in the controller 180, in response to environmental factors, or based on environmental factors detected from one or more associated sensors).

Figure 3:
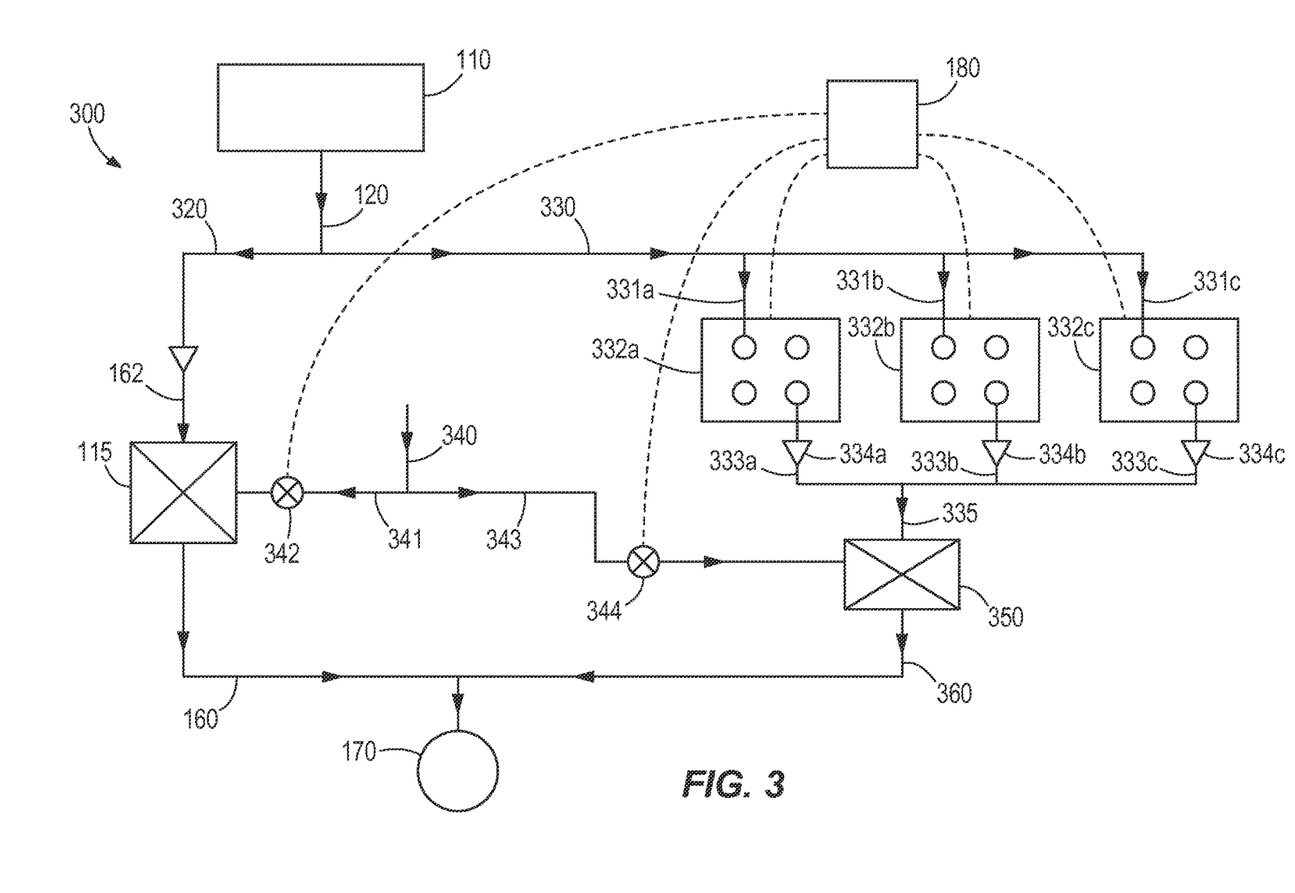
FIG. 3 is a flow diagram illustrating another exemplary system embodying the invention that selectively adjusts the concentration of chemical concentrate to be mixed with a diluent.

FIG. 3 illustrates another exemplary system 300 that selectively adjusts the concentration of chemical concentrate to be mixed with a diluent. The system 300 is similar to the system 100, and common elements are given the same reference numerals.

Referring to FIG. 3, the system 300 includes the chemical concentrate source 110, the first mix chamber or eductor 115, and the chemical supply line 120. The chemical supply line 120 branches into primary and second supply lines 320, 330. The primary supply line 320 is fluidly coupled between the source 110 and the first mix chamber 115.

The primary supply line 320 fluidly couples the source 110 with the eductor 115 to provide a continuous flow of concentrated chemical to the eductor 115, although a valve or other control mechanism can be disposed in the supply line 120 (e.g., to shutdown flow of chemical concentrate in the system 100) to control flow of chemical concentrate to the eductor 115. As illustrated, the primary supply line 320 includes a metering device 162 that is disposed downstream of the chemical concentrate source 110 and upstream of the eductor 115 to measure or meter the flow of concentrated chemical to the eductor 115.

The second supply line 330 supplies concentrated chemical from the chemical concentrate source 110 to one or more valves 332a-c. More specifically, the second supply line 330 branches into a plurality of chemical supply lines 331a-c, and each supply line 331a-c directs chemical concentrate to the respective valves 332a-c. The valves 332a-c are disposed in a parallel arrangement and are illustrated as latching solenoid valves by way of example only. It should be understood that the valves 332a-c can be any suitable valve to allow or restrict flow of concentrated chemical.

Each valve 332a-c includes a concentrated chemical outlet line 333a-c, and a metering device 334a-c is disposed in each chemical line 333a-c. The chemical lines 333a-c combine or join to form a single chemical line 335. In another example, the second supply line 330 may fluidly connect the chemical concentrate source 110 to a single valve 332. The quantity of valves 332 can vary and is selected to provide adjustment of the chemical concentration of the dilution.

With continued reference to FIG. 3, a diluent is fluidly connected to the eductor 115 by a diluent supply 340 that branches into a first diluent supply line 341, and a diluent supply valve 342 adjusts or controls the flow of diluent to the eductor 115. The valve 342 can be the same or different relative to the valve 132. The first discharge line 160 fluidly connects the eductor 115 to the system outlet 170. The diluent supply 340 also branches into a second diluent supply line 343 that has a second diluent supply valve 344 to adjust or control the flow of diluent to a second mix chamber or eductor 350.

The eductor 350 is fluidly connected to the valves 332a-c by the chemical line 335 so that chemical concentrate can be mixed with diluent in the eductor 350. A second discharge line 360 fluidly connects the eductor 350 with the system outlet 170. Although the first and second discharge lines 160, 360 are illustrated as connecting together into a single line prior to or upstream of the system outlet 170, the discharge lines 160, 360 may separately connect to the outlet 170.

The system 300 also includes the controller 180 that is in communication with the valves 332a-c and the diluent supply valves 342, 344. The controller 180 sends signals to the valves 332a-c and the diluent supply valves 342, 344 to control the valves based on the desired mixture of diluent and concentrated chemical at the outlet 170. To increase the concentration of chemical concentrate in the dilution, the controller 180 is programmed to 1) open one or more of the valves 332a-c to increase the flow of chemical concentrate, 2) at least partially close one or both of the diluent supply valves 342, 344 to reduce the flow of diluent, or 3) open one or more of the valves 332a-c and at least partially close the valves 342, 344. To decrease the concentration of chemical concentrate in the dilution, the controller 180 is programmed to 1) close one or more of the valves 332a-c to decrease (or eliminate) the flow of chemical concentrate, or 2) open (or further open) one or both of the diluent supply valves 342, 344 to increase the flow of diluent. In other examples, the controller 180 may be in communication with one or more of the eductors 115, 350, or any other suitable device, to control flow of concentrated chemical and/or diluent. Furthermore, the controller 180 can be in communication with one or more sensors to detect environmental factors, and to use information from the sensors to adjust the concentration of the dilution discharged from the system 300.

In operation of the system 300, concentrated chemical is delivered through the primary supply line 320 to the eductor 115. The flow of concentrated chemical through line 320 is measured or metered by metering device 162. At the eductor 115, the concentrated chemical passes through the eductor 115 without dilution (if diluent supply valve 342 is closed), or mixes with diluent supplied by the first diluent supply line 341 to form a dilution containing a predetermined concentration of chemical. After discharge from the eductor 115, the dilution (or concentrated chemical if not mixed with a diluent) travels through the discharge line 160 to the outlet 170 for discharge from the system 300.

The system 300 can selectively increase the chemical concentration in the discharged dilution in several ways as described above. First, by actuating one or both of the diluent supply valves 342, 344 to the closed position, the system 300 reduces (or eliminates) diluent flow to the eductors 150, 350. The reduction (or elimination) of diluent flow increases the concentration of the dilution that exits the eductors 150, 350 by mixing with the predetermined amount of concentrated chemical flowing through the system 300. Second, by actuating one or more of the valves 332a-c to the open position, the system 300 provides an additional flow of concentrated chemical from the source 110 to the eductors 150, 350 through the respective supply lines 333a-c. The additional flow of concentrated chemical can increase the concentration of the dilution discharged through the outlet 170 by mixing with the same amount of diluent. Either way, the system 300 may increase the chemical concentration based on instructions provided by a user, autonomously based on preset instructions in the controller, or in response to the environmental factors.

The system 300 also selectively decreases the chemical concentration in the discharged dilution in response to a user input or environmental factors (manually input or sensed). First, by actuating one or both of the diluent supply valves 342, 344 to the open position, the system 300 can increase diluent flow to the eductors 150, 350. The increase of diluent flow decreases the concentration of the dilution that exits the eductors 150, 350 by mixing with the same amount of concentrated chemical. Second, when the system 300 is operating with line 333a-c providing a flow of chemical concentrate to the eductor 350, one or more of the valves 332a-c can be closed to decrease (or cease) the additional flow of chemical concentrate through one or more of the lines 333a-c to the eductor 350. The reduction in chemical concentrate flow to the eductor 350 decreases the dilution concentration at the outlet 170 by mixing with the same amount of the dilution from the discharge line 160.

It should be appreciated that the minimum or lowest chemical concentration of the dilution is predetermined by the dilution ratio of concentrated chemical provided by one of the supply lines 320, 330 and diluent provided by the corresponding diluent supply line 341, 343 to the eductors 115, 350. The chemical concentration of dilution may then be increased by additional chemical concentrate from the other supply line 320, 330, and/or reduction of diluent from the diluent supply lines 341, 343. The system 300 may increase or decrease the chemical concentration of the dilution for similar reasons as system 100, including based on user instructions, autonomously based on preset instructions in the controller 180, in response to environmental factors, or based on environmental factors detected from one or more associated sensors.

Figure 4:
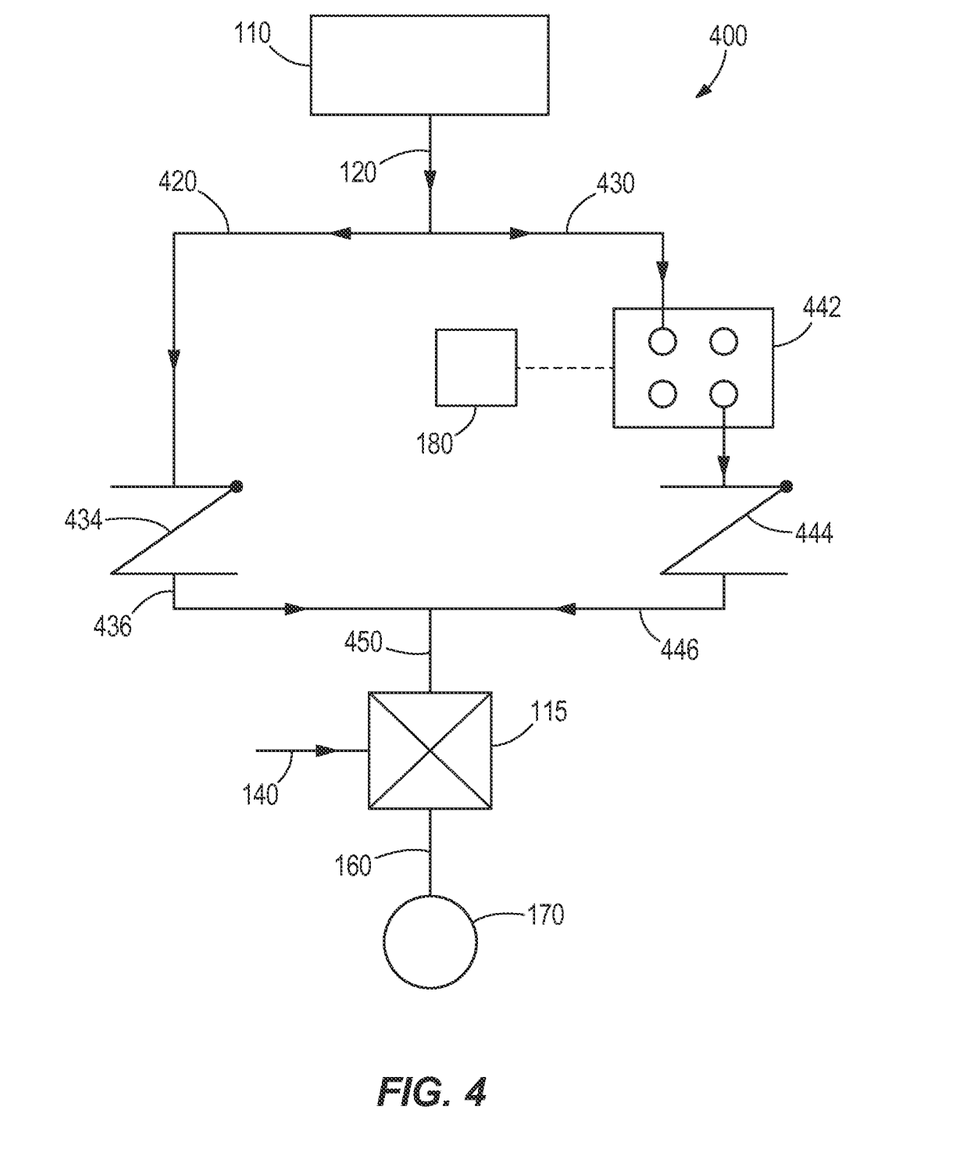
FIG. 4 is a flow diagram illustrating another exemplary system embodying the invention that selectively adjusts the concentration of chemical concentrate to be mixed with a diluent.

FIG. 4 illustrates another exemplary system 400 that selectively adjusts the concentration of chemical concentrate to be mixed with a diluent. The system 400 is similar to the system 100, and common elements are given the same reference numerals.

Referring to FIG. 4, the system 400 includes the chemical concentrate source 110, the first mix chamber or eductor 115, the chemical supply line 120, the discharge line 160, and the system outlet 170. The chemical supply line 120 branches into primary and second supply lines 420, 430. The first supply line 420 includes a non-return valve or check valve 434, which can include a metering tip (not shown). Downstream of the check valve 434, the first supply line 420 includes a line portion 436 that fluidly connects the check valve 434 to the eductor 115.

The second supply line 430 includes a flow regulator or valve 442 (e.g., a latching solenoid valve) to control additional chemical concentrate flow to the eductor 115. In general, the valve 442 may be any suitable valve to allow or restrict flow of concentrated chemical. The second supply line 440 also includes a check valve 444 that is disposed downstream of the valve 442 and upstream of the eductor 115. The check valve 444 is the same as check valve 434, and a line portion 446 fluidly couples the check valve 444 to the eductor 115. The line portions 436, 446 combine to form a single concentrated chemical inlet line 450 to provide a combined amount of chemical concentrate to the mix chamber 115. In other examples, the line portions 436, 446 may individually fluidly connect directly to the mix chamber 115.

The system 400 also includes the diluent supply line 140 that fluidly couples a diluent source to the eductor 115. The diluent source may be any suitable source of the diluent, such as a pipe, line, or vessel. One example of a diluent includes water, although the diluent may be any suitable or desired fluid, chemical, compound, or mixture. When chemical concentrate flow is active, the diluent supply line 140 provides a continuous flow of diluent to the eductor 115, and a valve can be provided to control diluent flow. The discharge line 160 fluidly connects the eductor 115 with the system outlet 170.

The system 400 further includes the controller 180 that is in communication with the valve 442 of the second supply line 440 to control the valve position to adjust the amount of chemical concentrate that is mixed with diluent in the eductor 115 in the same manner that the controller 180 controls the valve 332 described with regard to FIG. 3. More specifically, the controller 180 is programmed to open or close the valve 442 to increase the concentration of the dilution or to decrease the concentration of the dilution, respectively, based on environmental factors or user input.

In operation of the system 400, chemical concentrate is delivered through the chemical supply line 120 to the eductor 115 via the first supply line 420. Diluent mixes with the concentrated chemical in the eductor 115 to form a dilution that is discharged through the outlet 170. The system 400 can increase the chemical concentrate in the discharged dilution by a desired or predetermined amount by actuating valve 442 to an open position, which provides an additional flow of chemical concentrate from the source 110 to the eductor 115 through the second supply line 430. The additional flow of chemical concentrate increases the concentration of the dilution that exits the eductor 115 through the discharge line 160 by mixing with the same amount of diluent. The system 400 may increase the chemical concentration of the dilution based on instructions provided by a user, autonomously based on preset instructions in the controller, or in response to environmental factors.

When the system 400 is operating with both lines 420, 430 providing a flow of chemical concentrate to the eductor 115, the concentration of the dilution exiting the eductor 115 can be decreased by a desired or predetermined amount by actuating valve 442 to the closed position. By closing the valve 442, chemical concentrate stops flowing to the eductor 115 through the second supply line 430. The system 400 can decrease the chemical concentration of the dilution for similar reasons as the increase in chemical concentration.

It should be appreciated that the minimum or lowest chemical concentration of the dilution is predetermined by the dilution ratio of chemical concentrate provided by one of supply lines 420, 430 and diluent provided by the diluent supply line 140 to the eductor 115. The concentration of the dilution may be increased by providing additional chemical concentrate via the other respective supply line 420, 430 without increasing the amount of diluent. The system 400 may increase or decrease the concentration of the dilution for similar reasons as systems 100, 200, 300 including based on user instructions, preset instructions in the controller 180, in response to environmental factors, or based on environmental factors detected from one or more associated sensors.

Figure 5:
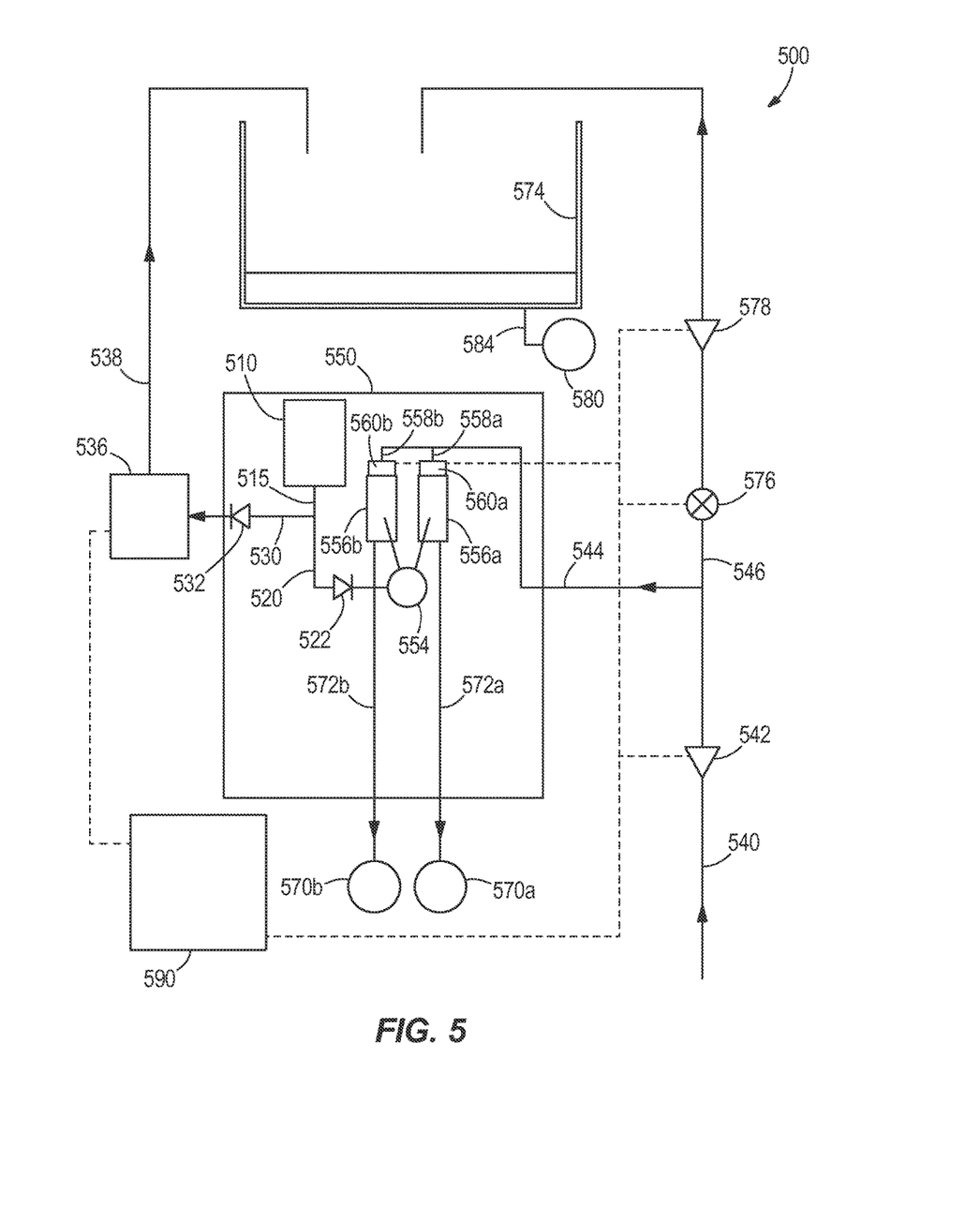
FIG. 5 is a flow diagram illustrating another exemplary system embodying the invention that selectively adjusts the concentration of chemical concentrate to be mixed with a diluent.

FIG. 5 illustrates another exemplary system 500 that selectively adjusts the concentration of chemical concentrate to be mixed with a diluent. The system 500 is similar to the system 100 described with regard to FIGS. 1-4.

Referring to FIG. 5, the system 500 includes a chemical concentrate source 510 and a chemical supply line 515. The chemical supply line 515 branches into a first chemical supply line 520 that has a non-return valve 522 (e.g., a check valve), and a second chemical supply line 530 that has a non-return valve 532 (e.g., a check valve) and that fluidly connects the check valve 532 to a metering device 536 (e.g., a pump such as a peristaltic pump, etc.—the metering device will be referred to herein as the "pump 536" for purposes of description). A chemical discharge line 538 is fluidly connected to a discharge side of the pump 536.

A diluent supply line 540 fluidly couples a diluent source (not shown) to the system 500. The diluent source may be any suitable source of the diluent, such as a pipe, line, or vessel. One example of a diluent includes water, although the diluent may be any suitable or desired fluid, chemical, compound, or mixture. The diluent supply line 540 has a first metering device 542 (e.g., a flow meter, a flow sensor, a flow switch, a check valve, a solenoid valve, etc.) to meter or measure the flow of the diluent. Downstream of the metering device 542, the diluent supply line 540 branches into a first diluent supply line 544 and a second diluent supply line 546.

With continued reference to FIG. 5, the first chemical supply line 520 and the first diluent supply line 544 separately fluidly connect to a mixing or proportioner dispensing assembly 550 (referred to herein as the "proportioner assembly" for purposes of description) to provide chemical and diluent, respectively, to the proportioner assembly 550. One exemplary proportioner assembly 550 includes the QuattroSelect® System manufactured by Diversey, Inc. (Sturdevant, Wis.), although other proportioner assemblies can be implemented in the system 500. As illustrated, the chemical concentrate source 510 is disposed in the proportioner assembly 550. It will be appreciated that the proportioner assembly 550 can include additional sources of chemical concentrate.

The first chemical supply line 520 fluidly connects to a selector valve 554 of the proportioner assembly 550. Although the illustrated system 500 includes one selector valve 554, it will be appreciated that additional selector valves can be implemented in the system 500. The illustrated selector valve 554 can be manually or automatically actuated to select the type of chemical concentrate to be mixed with diluent flowing through the proportioner assembly 550. The selector valve 554 selectively directs (based on the actuation position of the valve 554) chemical concentrate from the source 510 to mix chambers 556 (two mix chambers 556a, 556b are shown in FIG. 5). The mix chambers 556 can include eductors (e.g., the same or similar to the eductor 115) or another type of mix chamber. The position of the selector valve 554 determines which chemical concentrate (i.e. from the source 510 or another source) is fluidly connected to the mix chambers 556 (referred to hereinafter as "eductors" for purposes of description).

The first diluent supply line 544 enters the proportioner assembly 550 and branches into one or more diluent supply lines 558 (two exemplary supply lines 558a, 558b are shown). Each diluent supply line 558 is fluidly connected to a corresponding eductor 556. A valve or flow switch 560 (referred to herein as a "flow switch" for purposes of description) is coupled to each eductor 556 to control the diluent flow through the eductor 556. As illustrated, each eductor 556 includes a corresponding flow switch 560, although it will be appreciated that one flow switch 560 can be used to control flow through both eductors 556.

Each flow switch 560 can be activated automatically or manually (e.g., by actuation of a lever, a trigger, a button, etc.). Chemical concentrate from the supply line 520 mixes with diluent in one of the eductors 556 based on the flow switch 560 that has been activated. The amount of diluent flow provided to the eductors 556 can be controlled by the flow switches 560a, 560b. The amount of diluent flow through the eductors 556 determines the amount of chemical concentrate that is provided through the supply line 520. Each eductor 556 is fluidly connected to a first outlet 570 by a corresponding discharge line 572. Although FIG. 5 illustrates two separate outlets 570a, 570b (e.g., for a bottle fill and a bucket fill, respectively), it will be appreciated that the eductors 556 can be fluidly connected to a single outlet 570. Also, the discharge outlet 570 can have a nozzle, tap, or any other mechanism that is suitable to discharge dilution into a receptacle (e.g., a tank, a storage container, a cleaning machine such as an autoscrubber, or another type of vessel, etc.).

The second diluent supply line 546 fluidly connects the diluent source to a mix chamber 574 (e.g., a reservoir, a tank, or another type of chamber in which the diluent and chemical concentrate can be mixed, referred to herein generically as "chamber" for purposes of description). Although the system 500 is illustrated with the chamber 574 positioned above the proportioner assembly 550 (to utilize gravity to discharge the dilution from the chamber 574), it will be appreciated that the chamber 574 can be positioned at any suitable or desired location relative to the proportioner assembly 550.

With continued reference to FIG. 5, the second diluent supply line 546 has a flow regulator or valve or switch 576 (e.g., a solenoid valve) and a metering device 578 (e.g., a flow meter, a flow sensor, a flow switch, a check valve, a solenoid valve, etc.) to control and determine the diluent flow through the second diluent supply line 546.

The chemical discharge line 538 (via the second chemical supply line 530 and the pump 536) and the second diluent supply line 546 separately fluidly connect to the chamber 574 to provide chemical concentrate and diluent, respectively, to the chamber 574. The chemical concentrate and the diluent mix in the chamber 574 and the diluent-chemical mixture (i.e. dilution) can be dispensed through a second discharge outlet 580 (e.g., via a discharge line 584). The second outlet 580 can be the same as or different from the first outlet 570. For example, the second outlet 580 can include a similar or different tap, nozzle, or any other device suitable to discharge dilution (e.g., the end of a hose) for filling a receptacle (e.g., a tank, a storage container, a cleaning machine such as an autoscrubber, or another type of vessel, etc.). For purposes of the claims, the term "discharge" is meant to encompass any fluid line (e.g., discharge lines 160, 240, 360, 572) or outlet (e.g., outlets 170, 570, 580) that is coupled to the mix chamber (e.g., chamber 115, 234, 350, 556, 574) through which the dilution is directed from the mix chamber.

As illustrated, the diluent supply line 540 provides a continuous flow of diluent to the proportioner assembly 550 via the first diluent supply line 544. When the flow switch 576 is activated (e.g., open), the diluent supply line 540 also provides a continuous flow of diluent to the chamber 574 via the second diluent supply line 546. That is, when the flow switch 576 is activated, diluent flows concurrently to the proportioner assembly 550 and the chamber 574. Optionally, the illustrated system 500 can include a diluent stop feature (e.g., a valve) that controls diluent flow to the proportioner assembly 550.

The chemical concentrate flow provided by the pump 536 to the chamber 574 is based on the diluent flow provided to the chamber 574 and a targeted concentration for the resultant dilution. To facilitate control of the chemical concentrate flow, the system 500 includes a control system that has a controller 590 (e.g., the same as the controller 180) that is in communication with and operatively coupled to components of the system 500 (e.g., the valves, the flow switches, the flow meters, the pump, etc.) to control the proportioner assembly 550 as well as delivery of the chemical concentrate and diluent to the chamber 574. More specifically, the controller 590 measures the diluent flow via inputs from one or more of the flow meter 542, the position of the valve 576, and the flow switch 578, and the controller responsively controls the pump 536 to discharge a proportional amount of chemical concentrate into the chamber 574.

To increase or decrease the concentration of chemical concentrate in the dilution at the first outlet 570, the controller 590 can be programmed to alter the amount of chemical concentrate delivered from the source 510. Furthermore, and like the controller 180, the controller 590 can be in communication with one or more sensors to detect environmental factors, and to use information from the sensors to adjust the concentration of the dilution discharged through the outlet 570.

To increase the concentration of chemical concentrate in the dilution at the second outlet 580, the controller 590 can be programmed to 1) increase the speed of pump 536 to increase the flow of chemical concentrate to the chamber 574, 2) at least partially close the switch 578 to decrease (or eliminate) the flow of diluent, or 3) some combination of both 1) and 2). To decrease the concentration of chemical concentrate in the dilution at the second outlet 580, the controller 590 can be programmed to 1) decrease the speed of pump 536 to decrease (or eliminate) the flow of chemical concentrate to the chamber 574, or 2) at least partially open (or further open) the switch 578 to increase the flow of diluent. Furthermore, and like the controller 180, the controller 590 can be in communication with one or more sensors to detect environmental factors and to use information from the sensors to adjust the concentration of the dilution discharged from the system 500.

In operation of the system 500, chemical concentrate from the source 510 is delivered through the chemical supply line 515 to the proportioner assembly 550 by the first supply line 520 when the selector valve 554 is placed in the designated position for fluid communication with the source 510. In response to diluent flow through one of the eductors 556 (e.g., activated by a desired flow rate of dilution through the outlet 570), chemical concentrate from the source 510 flows through the selector valve 554 to the eductor 556 through which diluent flows. Diluent and chemical concentrate mix within the eductor 556 to form a dilution that is discharged through the outlet 570. The chemical concentration of the dilution will vary depending on the amount of chemical concentrate supplied to the eductor 556. The system 500 may increase or decrease the chemical concentration of the dilution discharged through the discharge outlet 570 based on instructions provided by a user, autonomously based on preset instructions in the controller, in response to environmental factors, or a combination of instructions and factors.

The flow rate of the resultant dilution is determined by the flow switch 560a, 560b that has been activated (e.g., by pressing a lever or trigger or button). The eductors 556a, 556b are appropriately sized to provide different diluent flow rates (e.g., a high flow rate and a low flow rate). Depending on the desired flow rate, which is indicated by actuation of the appropriate switch 560a, 560b, the selector valve 554 will provide chemical concentrate to the corresponding eductor 564a, 564b.

During operation, chemical concentrate also (or alternatively) can be delivered through the chemical supply line 515 to the pump 536 by the second supply line 530. The pump 536 delivers chemical concentrate to the chamber 574 based on the diluent flow to the chamber 574 from the diluent supply line 546 and a targeted concentration of the dilution. In the chamber 574, the diluent mixes with the chemical concentrate to form the dilution that is discharged through the second outlet 580.

The system 500 can increase the chemical concentrate in the dilution discharged from the second outlet 580 by a desired or predetermined amount by decreasing the diluent flow from the diluent supply line 544 (via adjustment of the flow switch 578), increasing the speed or output of the pump to provide more chemical concentrate, or both. The reduced flow of diluent and/or the greater flow of chemical concentrate increases the concentration of the dilution by mixing the same or a greater amount of chemical concentrate with less or the same amount of diluent, respectively.

The system 500 can decrease the chemical concentrate in the dilution discharged from the second outlet 580 by a desired or predetermined amount by increasing the diluent flow from the diluent supply line 544 (via adjustment of the flow switch 578), decreasing the speed or output of the pump to provide less chemical concentrate, or both. The increased flow of diluent and/or reduced flow of chemical concentrate decreases the concentration of the dilution by mixing the same or a lesser amount of chemical concentrate with more or the same amount of diluent, respectively. The system 500 can increase or decrease the chemical concentration of the dilution discharged through the discharge outlet 580 based on instructions provided by a user, autonomously based on preset instructions in the controller, or in response to environmental factors.

As will be appreciated by the foregoing description, the systems 100, 200, 300, 400, 500 can dilute a chemical concentrate to different concentrations to provide adequate chemical to clean an environment (e.g., a floor). The system 100, 200, 300, 400, 500 defines a dispenser system that can be manually or automatically controlled to alter chemical dilution levels based on desired adjustments or in view of predetermined conditions (e.g., environmental factors such as a weather event or forecast of weather, changes in weather, humidity, or temperature, seasonal changes, amount of pedestrian traffic, changes in the physical environment, or any other information etc.). The system 100, 200, 300, 400, 500 can also be controlled locally or remotely using the controller 180. The dispenser system 100, 200, 300, 400, 500 alters the amount of chemical concentrate in a dilution via one or more valves disposed in one or more paths that either reconnect to a single eductor, or that feed chemical concentrate to separate eductors to adjust the mixture ratio of chemical concentrate and diluent, to increase the quantity of dilution, or both. More than two flow paths can be provided depending on the variation in dilution that is desired.

The invention claimed is:

1. A dispenser system comprising:
   a source of chemical concentrate;
   a source of diluent;
   a mix chamber in fluid communication with the source of chemical concentrate via a first line and with the source of diluent via a second line to mix chemical concentrate and diluent to form a dilution;
   one or more metering devices disposed in one or both of the first line and the second line;
   a discharge fluidly coupled to the mix chamber to deliver the dilution to a downstream receptacle; and
   a control system in communication with the one or more metering devices and programmed to adjust a concentration of chemical concentrate in the dilution via control of the one or more metering devices based on an environmental factor affecting a physical environment to be cleaned using the dilution,
   wherein the mix chamber defines a first mix chamber in the form of an eductor and the dispenser system further includes a second mix chamber in separate fluid communication with the source of chemical concentrate and the source of diluent, and wherein the second mix chamber is defined by a reservoir positioned to separately receive chemical concentrate and diluent from the respective sources.

2. The dispenser system of claim 1, wherein the environmental factor includes a weather event, a forecast of weather, a change in weather, a change in humidity, a change in temperature, a change in season, a change in an amount of pedestrian traffic, or a change in the physical environment.

3. The dispenser system of claim 1, wherein the control system is programmed to autonomously adjust the concentration of chemical concentrate in the dilution based on one or more preset instructions in response to the environmental factor.

4. The dispenser system of claim 1, wherein the first line includes at least one of the one or more metering devices, and wherein the at least one of the metering devices in the first line is defined by a pump to deliver chemical concentrate to the first mix chamber.

5. The dispenser system of claim 4, wherein the pump includes a peristaltic pump.

6. The dispenser system of claim 1, wherein the first line is bifurcated into two first line portions and the second line is bifurcated into two second line portions, wherein one each of the first line portions and the second line portions directs chemical concentrate and diluent from the respective sources to the one of the first and second mix chambers, and wherein the first line portion associated with the second mix chamber is the only line portion including the one or more metering devices.

7. The dispenser system of claim 1, further comprising another first line in fluid communication with the source of chemical concentrate, wherein the another first inc is the only first line including another one or more metering devices.

* * * * *